March 4, 1958  M. H. THORNTON  2,825,351
TENT CARRIED ON VEHICLE
Filed Sept. 28, 1953  3 Sheets-Sheet 1
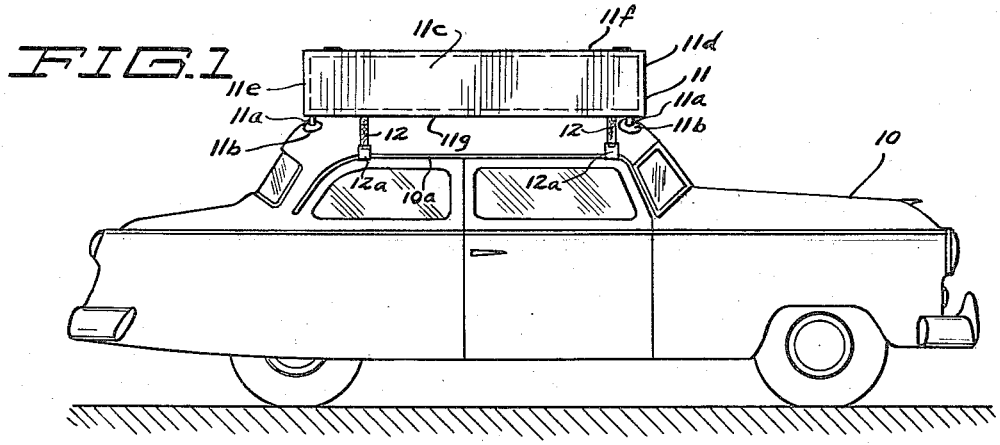
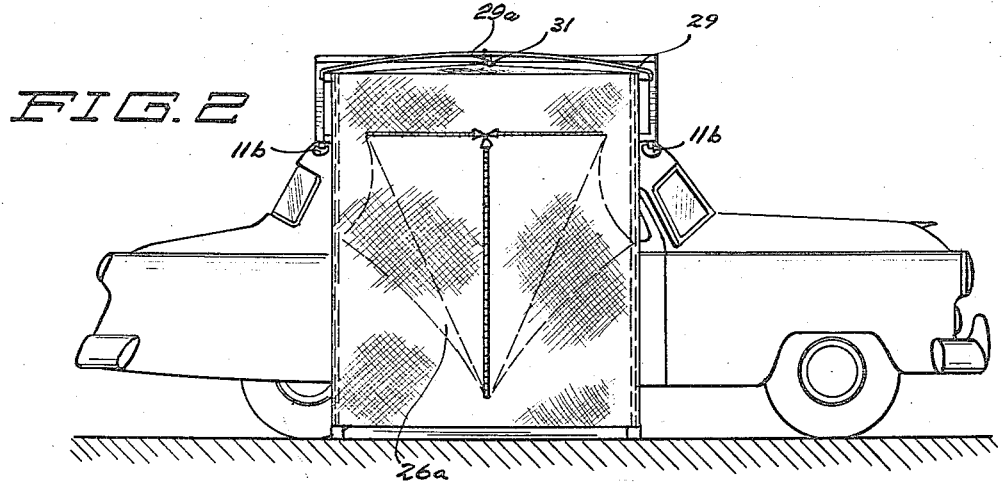
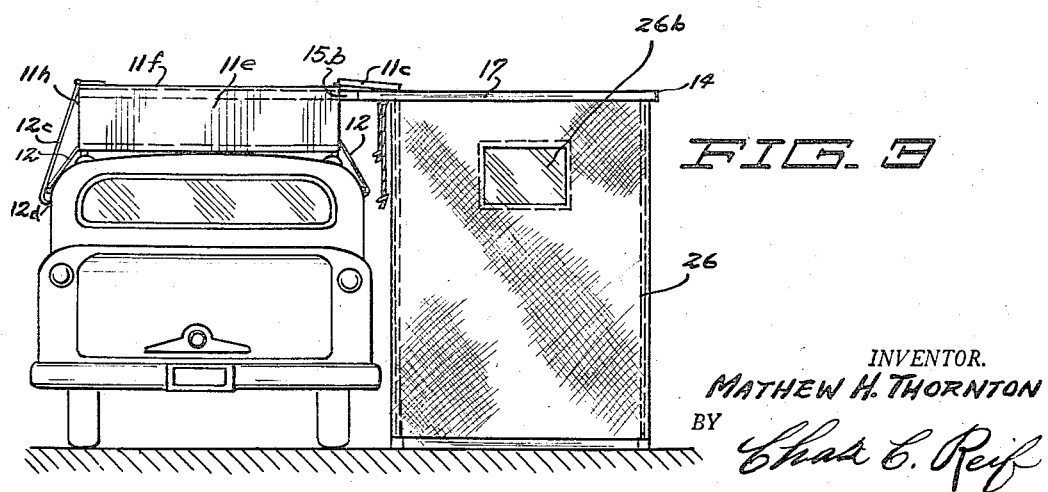
INVENTOR.
MATHEW H. THORNTON
BY
Chas. C. Reif
ATTORNEY

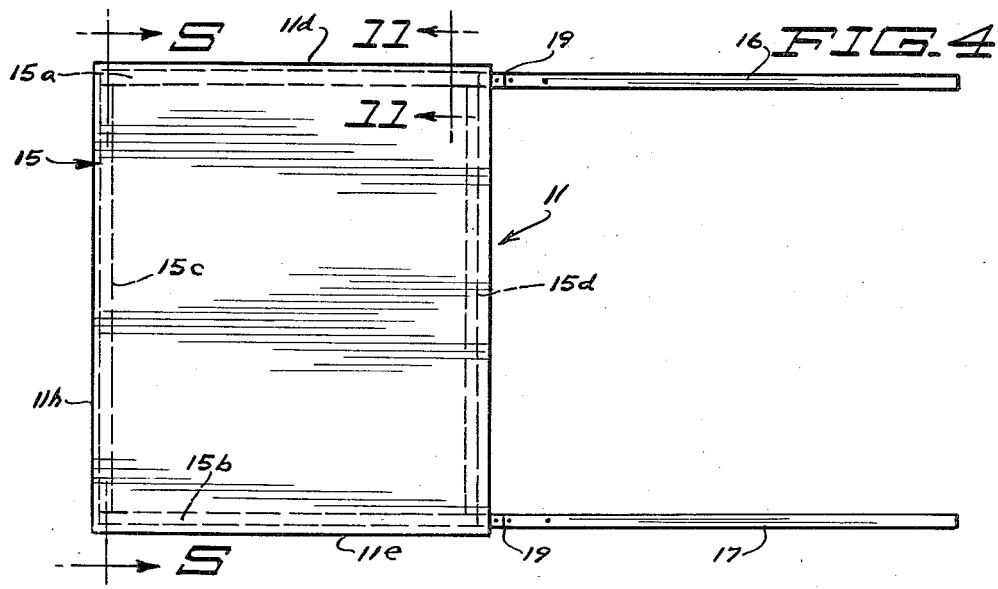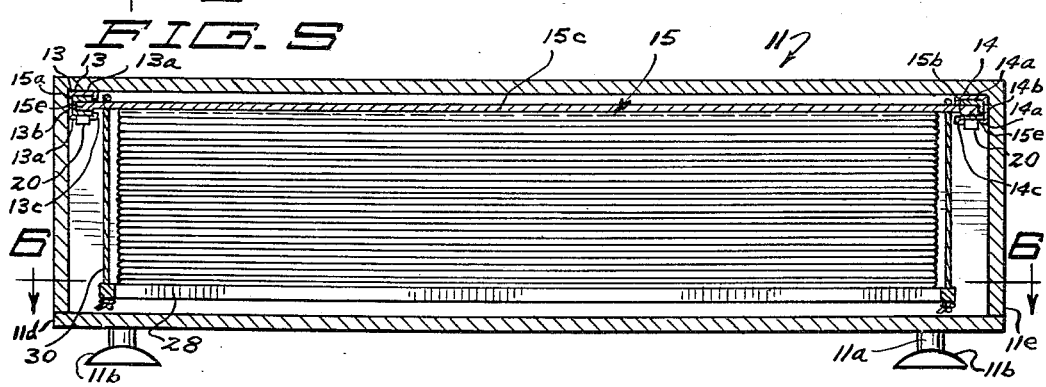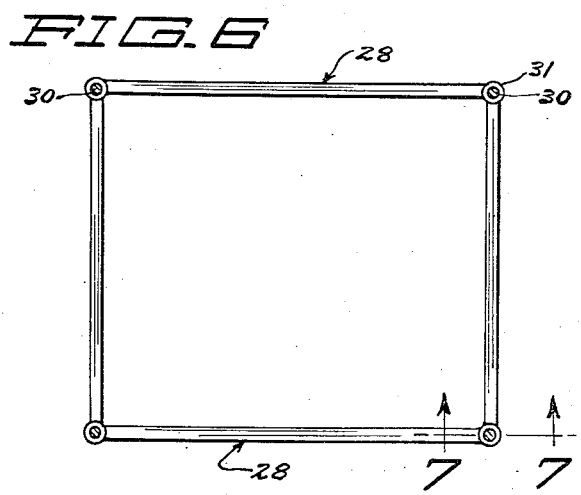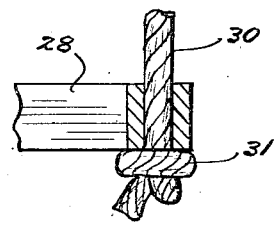

March 4, 1958 M. H. THORNTON 2,825,351
TENT CARRIED ON VEHICLE
Filed Sept. 28, 1953 3 Sheets-Sheet 3
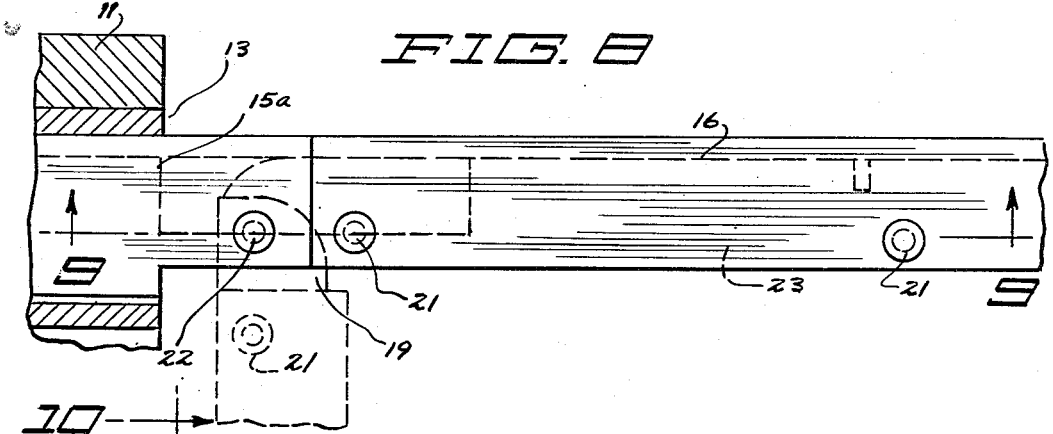
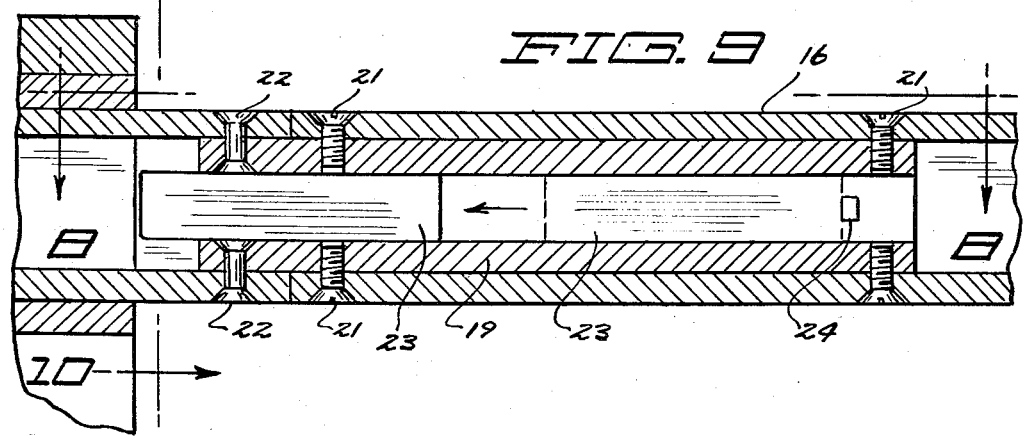
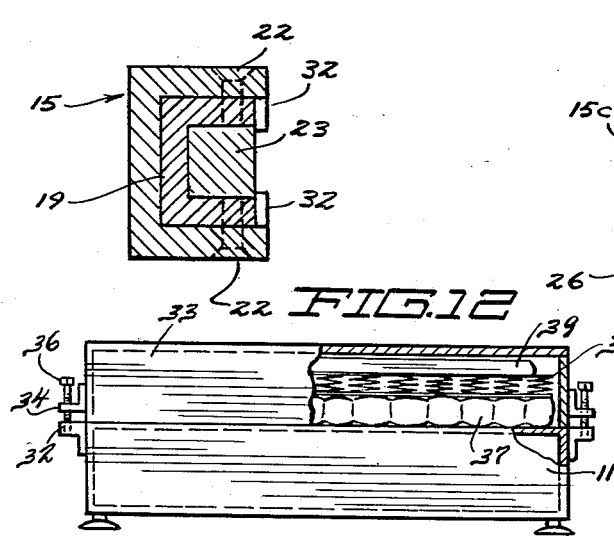
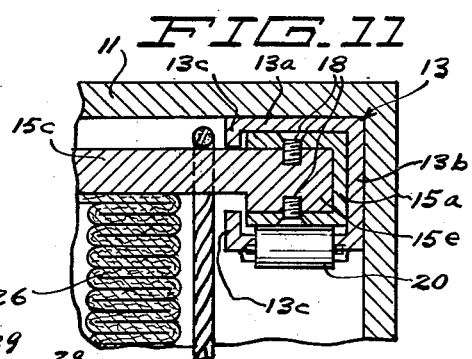
INVENTOR.
MATHEW H. THORNTON
BY Chas. C. Reif
ATTORNEY United States Patent Office 2,825,351
Patented Mar. 4, 1958

2,825,351
TENT CARRIED ON VEHICLE
Mathew H. Thornton, St. Paul, Minn.
Application September 28, 1953, Serial No. 382,593
6 Claims. (Cl. 135—1)

This invention relates to a tent to be used for camping, touring, ice fishing, etc., and more specifically to a camping tent to be used in connection with a vehicle. It is desirable to have a tent such as can be conveniently carried on a vehicle and be placed in a suspended operating position adjacent one side of said vehicle when so desired.

It is an object of this invention to provide a tent which when not in use can be carried on a vehicle and which when in use can be held in suspended position adjacent one side of said vehicle.

It is another object of this invention to provide a tent disposable in a casing carried on a vehicle, said casing having members therein slidable to one side thereof and having the upper portion of said tent secured thereto whereby said tent may be held in a suspended position adjacent one side of said vehicle.

It is another object of this invention to provide a tent disposable in a casing to be carried on a vehicle, said casing having guide members therein, a holding member slidable to one side of said casing in said guide members, said tent having its upper end portion secured to said holding member and means secured to said holding member to foldably raise said tent upwardly to said holding member whereby said tent may be held in suspended position adjacent one side of said vehicle and said tent may be placed in a raised accordion-like folded condition to be disposed in said casing.

It is more specifically an object of this invention to provide a tent, a casing generally rectangular in form secured to the top of a vehicle, said casing having guide members, supporting members slidable in said guide members and movable to one side of said casing transversely of said vehicle, a top member disposable in said casing and slidable in said guide members, said last mentioned member having the upper end portion of said tent secured thereto, a bottom member secured to the bottom portion of said tent, means for connecting said bottom member and said top member and for moving said bottom member upwardly toward said top member whereby said bottom member may be moved upwardly toward said top member and said tent may be placed in a folded position therebetween and said members and said tent may be disposed in said casing.

These and other objects and advantages of the invention will be fully set forth in the following description made in connection with the accompanying drawings in which like reference characters refer to similar parts throughout the several views and in which:

Fig. 1 is a view of applicant's device in side elevation in position on a vehicle;

Fig. 2 is a view of applicant's device in side elevation in operating position;

Fig. 3 is a view similar to Fig. 2 showing applicant's device in end elevation in operating position with some parts shown in dotted lines;

Fig. 4 is a partial top plan view of applicant's device in operating position with some parts shown in dotted lines;

Fig. 5 is a view in vertical section taken on line 5—5 of Fig. 4, as indicated by the arrows;

Fig. 6 is a top plan view of a portion of applicant's device taken on line 6—6 of Fig. 5, as indicated by the arrows;

Fig. 7 is a partial view in elevation with some parts shown in vertical section, taken on line 7—7 of Fig. 6, as indicated by the arrows;

Fig. 8 is a partial top plan view taken on line 8—8 of Fig. 9, as indicated by the arrows;

Fig. 9 is a partial view in vertical section taken on line 9—9 of Fig. 8, as indicated by the arrows;

Fig. 10 is a partial view in vertical section taken on line 10—10 of Fig. 9, as indicated by the arrows;

Fig. 11 is a partial view in vertical section taken on line 11—11 of Fig. 4, as indicated by the arrows; and Fig. 12 is a view in side elevation of a modification of a portion of applicant's device showing some parts in dotted line, some parts in section and some parts in a broken view.

Referring to the drawings, and more specifically to Figs. 1–3, a vehicle 10 is shown. Said vehicle may be any of the hard top type vehicles in use. Carried on said vehicle is a casing 11. Said casing is generally parallelepiped in form and has leg portions 11a extending therebelow. Said leg portions have suction members 11b at their lower end portions which support said casing on said vehicle. Said suction members 11b rest on the roof of said vehicle. Secured at each side of said casing are strap members 12. Said strap members 12 have secured to their respective end portions hook members 12a which are hooked to channel members 10a which run longitudinally across the upper edge portions of said vehicle and are common in the construction of all such vehicles. An additional pair of supporting strap members 12c having hook end portions 12d are disposed about the window frames at one side of said vehicle.

Said member 11 in the embodiment of the invention here disclosed, is approximately the size in plan as the top portion of said vehicle. Hingedly secured to one side of said casing 11 is an upwardly swinging closing member 11c. Said member 11c extends the length of one side of said casing longitudinally of said vehicle. Said casing 11 is comprised of side members 11d and 11e, a top member 11f, a bottom member 11g and an end member 11h. Disposed in said casing 11 along the upper edge portions of sides 11d and 11e and coextensive therewith are channel members 13 and 14 respectively. Said channel members respectively comprise flange portions 13a and 14a and web portions 13b and 14b. The outer edge portions 13c and 14c respectively of said flange members are turned inwardly at right angles to restrict the opening therebetween. The open sides of said channels are disclosed as facing each other. Slidable in said channels is a substantially rectangular rigid member or frame 15 which is formed of side channel members 15a and 15b and end bar members 15c and 15d. Said bar members have enlarged outer end portions 15e, the same being respectively secured by screws 18 to members 15a and 15b at their respective points of intersection. Member 15d is here disclosed as intersecting members 15a and 15b a short distance back of their respective end portions. Said member 15 is slidable in channels 13 and 14 transversely of said vehicle 10.

Pivotally secured to members 15a and 15b respectively are auxiliary supporting members 16 and 17. Said members 16 and 17 are formed as channel shaped members having their open sides facing each other. Said members 16 and 17 are respectively secured to members 15a and 15b by hinge members 19. Said hinge members are here disclosed as being formed in the shape of channel members respectively having the greater portions thereof disposed in members 16 and 17 and being secured thereto by rivets 21. Said members 19 respectively have their other end portions disposed in members 15a and 15b and are pivotally secured thereto by rivets 22. Members 16 and 17 are constructed to be swung inwardly to overlap when not in use when said casing 11 is in packed condition and to be swung outwardly in a horizontal plane when placed in operating position to be in alignment respectively with members 15a and 15b. When member 15 is moved outwardly of casing 11, said members 16 and 17 are moved forwardly into said casing in channels 13 and 14 respectively and extend outwardly of the other side of said casing for a short distance and become supporting members to hold said member 15 in a suspended position.

Disposed in members 16 and 17 adjacent said hinges 19 are relatively short slidable members 23. Said slidable members are here disclosed as being formed as bars substantially rectangular in vertical cross section and are movable in channels 16 and 17 through said hinges 19 to have end portions thereof respectively disposed in the end portions of members 15a and 15b. Stop members 24 are provided in members 16 and 17 respectively and shown here as a raised lug portion to limit the movement of member 23 away from members 15a and 15b. A plurality of flange portions 32 are secured to members 15a, 15b, 16 and 17, as disclosed in Fig. 10, to hold said members 24 in operating position. Rollers 20 are respectively journaled in the end portions of said channel members 13 and 14 at one side of said casing and said members 15 and the portions of members 16 and 17 adjacent thereto are moved over said rollers.

A tent 26 is provided. Said tent may be made of any of the well known materials used for this purpose and said tent is here disclosed as being substantially rectangular in cross section. An opening 26a is provided at one side of said tent and is formed as a doorway. A flexible window 26b is provided at one side of said tent. The upper end portion of said tent is secured to the four sides of member 15 and may be secured thereto in any suitable manner, as by rivets or by clamps. A substantially rectangular member 28 is provided which has secured thereto the lower end portion of said tent 26. Connecting members 30 are provided and are here disclosed as being made of rope. Said members are disposed through openings provided in each of the corners of members 28 and through members 15c and 15d in vertical alignment therewith. Said members 30 respectively have ends fastened to the underportion of each of the corners of said member 28 and extending upwardly through each of the openings of members 15c and 15d whereby the ends of members 30 extending through the openings of members 15c and 15d may be pulled downwardly to raise member 28 upwardly towards member 15 and tent 26 is accordion folded therebetween. Washers 31 are provided at the underside of member 28 to act as holding members for the lower ends of member 30 which may be knotted. A rigid bar-shaped member 29 is provided adapted to extend across member 15 and have its end portions removably clamped to the end portions of members 15a and 15b. A hook member 29a is secured to the central portion of member 29 and a loop 31 secured to the central top portion of said tent is disposed over said hook to raise said central top portion of said tent when in operating position.

In operation, tent 26 will be carried in casing 11 and may be freely moved about on the top of a vehicle, such as vehicle 10. When it is desired to use tent 26, member 11c will be moved upwardly and member 15 will be drawn or pulled outwardly. Member 15 slides very easily in channel members 13 and 14 and moves over rollers 20. As member 15 is moved out of said casing 11, members 16 and 17 are unfolded outwardly horizontally and they are drawn inwardly of said casing 11 in said channel members. Thus when member 15 extends outwardly of said casing, members 16 and 17 act as supporting members and hold member 15 in suspended position. Members 23 are then moved along members 16 and 17 to have a portion thereof disposed in the end portions of members 15a and 15b to add strength and rigidity to said hinge members 19. Members 30 are then unfastened and released so that member 28 will move downwardly and tent 26 will become unfolded and pulled downwardly by the action of gravity. Said tent 26 is then ready for use. If desired, it may then be fastened in position, as by stakes, in a manner well known to all users of tents if it is so desired. Hook member 29a is placed in position and loop 31 is placed over said hook 29a to raise the central top portion of said tent so that it will shed water easily. Tent 26 is thus placed in operating position.

When it is desired to pack tent 26 in casing 11, the loop 31 is removed from hook 29a and member 29 is removed from member 15. The end portions of members 30 are then pulled downwardly and member 28 is moved upwardly towards member 15 and tent 26 is folded accordion-like therebetween. Said members 30 may then be easily fastened to hold said member 28 in raised position. Member 15 is then easily moved inwardly of casing 11 in guide members 13 and 14. Closing member 11c is moved downwardly. Members 16 and 17 which now extend outwardly of said casing are folded to overlap one another. Said tent is now completely packed in said casing 11.

Referring to Fig. 12, member 11 is shown somewhat modified in form having apertured brackets 32 secured to each end thereof. An auxiliary casing 33 is provided having apertured brackets 34 secured thereto respectively in alignment with said brackets 32. Fastening members 36, here illustrated as bolts, are provided to secure said brackets together.

Said auxiliary casing 33 provides a storage space for various articles which would be used in camping or touring. Casing 33 as shown has therein a mattress 37, a bed spring 38 and a table 39. These may easily be removed manually for use.

Thus it is seen that I have provided a very efficient and easily handled portable camping tent which may be easily carried in a casing secured to the top of a vehicle and which may be placed in operating position very quickly and very easily adjacent one side of said vehicle.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A tent to be used in connection with a vehicle having in combination, a tent, a casing of general parallelepiped form and having a substantial height on said vehicle, guide members disposed at opposite sides of said casing transversely of said vehicle, a member movable in said guide members and extendable outwardly therefrom, auxiliary supporting members pivotally secured to said member and movable in said guide members, said first mentioned member having the upper end portion of said tent secured thereto, a member secured to the lower portion of said tent, means connecting said first mentioned member and said last mentioned member for raising said last mentioned member upwardly adjacent said first member whereby said tent may be put in folded position and disposed in said casing with said first and said last mentioned members.

2. A tent to be used in connection with a vehicle having in combination, a casing generally parallelepiped in form and having a substantial height, members having suction cup tipped end portions for supporting said casing on said vehicle, members securing said casing to said vehicle, guide members disposed at opposite sides of said casing transversely of said vehicle, a rigid member slidable in said guide members, a tent having its upper end portion secured to said last mentioned member, auxiliary supporting member respectively pivotally secured to said last mentioned member and movable in said guide members for holding said last mentioned member in suspended position, and means for raising said tent in folded condition adjacent said last mentioned member or for lowering the tent.

3. The structure set forth in claim 2, a floor member disposed in said casing, the bottom end portion of said tent being secured to said floor member, said last mentioned means connecting said rigid member and said last mentioned member.

4. The structure set forth in claim 3, and a bar member disposable over the top of said rigid member, and means for hooking and raising the central top portion of said tent to said bar member whereby the top of said tent will quickly shed water.

5. A tent to be used in connection with a vehicle having in combination, a casing substantially parallelepiped in form secured to the top of said vehicle, a member slidably supported by said casing and slidable outward to one side of said vehicle, a tent adapted to be folded accordion-like in said casing and having its upper end portion secured to said member and suspendable therefrom, spaced channels in said casing in which said member is slidable into and out of said casing, and means connected to said member and to the bottom of said tent for folding said tent upwardly adjacent said member whereby said folded tent and said member are slidable into said casing.

6. A tent to be used in connection with a vehicle having in combination, a casing of parallelepiped form secured to the top of said vehicle, a member slidable in said casing and extendable outward to one side thereof, means in said casing for holding said member suspended in extended position, a tent disposed in said casing in accordion-like folds and having a portion thereof secured to said member, means for releasing said tent to depend from said member in operating position and to be drawn upwardly adjacent said member in accordion-like folded condition, guide members formed at opposite sides of said casing transversely of said vehicle, said member having portions movable in said guide members and said means comprising elongated supporting members hinged to said portions of said member movable in said guides for holding said member suspended in extended position.

References Cited in the file of this patent

UNITED STATES PATENTS

| | | |
|---|---|---|
| 1,285,766 | Martin | Nov. 26, 1918 |
| 1,659,825 | MacKay | Feb. 21, 1928 |
| 1,752,571 | Olson | Apr. 1, 1930 |
| 1,834,489 | Hauber | Dec. 1, 1931 |
| 1,849,738 | Amico | Mar. 15, 1932 |
| 2,134,879 | Levy | Nov. 1, 1938 |
| 2,496,085 | Engelheart | Jan. 31, 1950 |

FOREIGN PATENTS

| | | |
|---|---|---|
| 798,110 | France | Mar. 2, 1936 |